United States Patent [19]

Bornefeld et al.

[11] 4,326,907
[45] Apr. 27, 1982

[54] METHOD OF IDENTIFYING PISTON RINGS

[75] Inventors: Horst Bornefeld, Burscheid; Hans P. Fort, Bergisch Gladbach; Werner Engel, Leverkusen, all of Fed. Rep. of Germany

[73] Assignee: Goetze AG, Burscheid, Fed. Rep. of Germany

[21] Appl. No.: 79,214

[22] Filed: Sep. 26, 1979

[30] Foreign Application Priority Data

Sep. 27, 1978 [DE] Fed. Rep. of Germany ....... 2841917

[51] Int. Cl.$^3$ ........................... B32B 1/04; F02F 5/00
[52] U.S. Cl. .................................... 156/212; 156/150; 156/153; 156/654; 156/DIG. 3; 204/15; 204/25; 204/224 R; 277/216; 277/235 R; 427/256; 427/282; 427/287; 428/40; 428/339

[58] Field of Search ................... 204/15, 25, 224 R; 29/156.6, 156.63; 277/216, 235 R; 427/256, 282, 287; 156/60, 212, 216, DIG. 3, 150, 153, 654; 428/40, 65, 339

[56] References Cited

U.S. PATENT DOCUMENTS

| 1,380,924 | 6/1921 | Peters et al. | 156/492 |
| 3,571,898 | 3/1971 | Fuhrmann | 29/407 |
| 3,582,452 | 6/1971 | Britton | 428/40 X |

FOREIGN PATENT DOCUMENTS

| 1251114 | 4/1968 | Fed. Rep. of Germany . |
| 7039835 | 1/1971 | Fed. Rep. of Germany . |

Primary Examiner—Edward C. Kimlin
Assistant Examiner—Robert A. Dawson
Attorney, Agent, or Firm—Spencer & Kaye

[57] ABSTRACT

Piston rings of asymmetrical cross section are identified by providing a surface marking which extends from one flank face of the piston ring to the outer circumferential face (running face) thereof.

3 Claims, 1 Drawing Figure

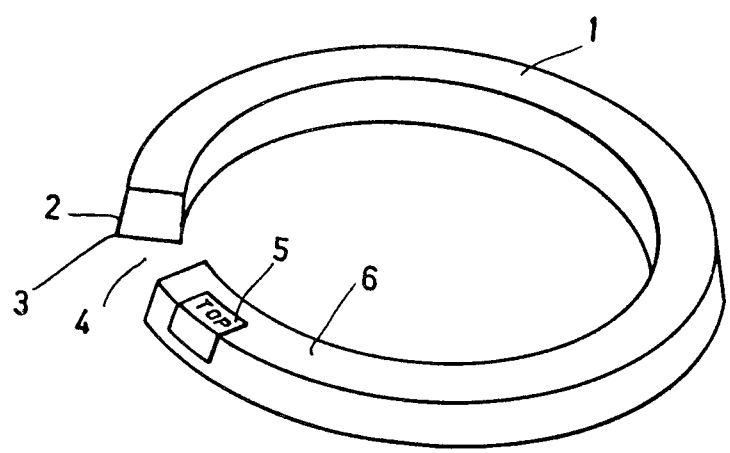

METHOD OF IDENTIFYING PISTON RINGS

BACKGROUND OF THE INVENTION

This invention relates to a method of identifying piston rings having an asymmetrical cross section such as taper face rings, scraper rings or bevelled edged rings. The method comprises the application of a marking which extends from an annular face (flank face) of the piston ring to a circumferential face thereof.

For identifying piston rings, particularly piston rings having a non-cylindrical running face, so-called "top" markings have been stamped on the annular faces of the piston ring adjacent the piston ring gap to ensure a proper positioning of the piston ring when installed in the engine. While the piston rings have the "top" marking on that annular face which is to be oriented towards the combustion chamber, it occurs quite frequently that individual rings, in the course of further machining, stacking or packaging are accidentally inverted so they are positioned in an inverted state in the piston ring stack. Since in general the piston rings are no longer drawn onto the piston manually (this operation has largely been taken over by machines) the installer has to rely fully on the piston ring manufacturer concerning the correct positioning of the piston rings in the packages. Piston rings drawn onto the piston in an inverted position not only affect adversely the operation of the engine, but later necessitate a time-consuming disassembly thereof. Although with significant labor and thus with the substantial cost the above-descirbed error can conceivably be detected during the final inspection of the piston rings, such individual checking is otherwise only seldom justified and furthermore, the possibility of oversight by the inspectors (due to carelessness or fatigue) cannot be discounted.

German Pat. No. 1,251,114 discloses piston rings having a circumferential groove which is provided in the running face of the piston ring for mechanically sensing the position of the piston rings. This type of marking, however, is expensive to provide: markings on the running faces of the piston rings must not exceed a certain thickness since the surface quality of the running faces has to meet very high standards. If a marking of substantial depth is provided, its sealing function in the engine may be adversely affected.

Further, according to German Utility Model (Gebrauchsmuster) No. 7,039,835, each piston ring is provided with a notch which extends from one of the annular faces to one of the circumferential faces of the piston ring. It is a disadvantage of such an arrangement that the notch can only extend into the inner, and not into the outer circumferential face and thus the packaged rings can be checked only with difficulty concerning their correct positioning. If such a notch extended from one of the annular faces to the outer circumferential face (that is, the running face of the piston ring), the latter would no longer have the required sealing properties.

It is further generally known to identify piston rings by stamping the annular faces. Such a method, however, is generally not acceptable because of the resulting protrusions of material and the damaging of the wear-resistant layers which are at least partially applied to the running faces.

SUMMARY OF THE INVENTION

It is an object of the invention to so improve the above-outlined method of identifying piston rings of asymmetrical cross section that an inverted position of any individual piston ring in a package can be readily detected and further, the marking does not adversely affect the properties of the piston ring.

This object and others to become apparent as the specification progresses, are accomplished by the invention, according to which, briefly stated, the marking is applied in one operational step exclusively on the upper surface of one of the annular faces and one part of the running face (outer circumferential face) of the piston ring.

It is an advantage of the above-outlined method according to the invention that the installing personnel can determine immediately upon visual inspection of the outer face of the packed piston rings whether all rings are positioned in their proper orientation.

BRIEF DESCRIPTION OF THE FIGURE

The sole FIGURE is a perspective view of a piston ring having a marking thereon applied with a method according to the invention.

DESCRIPTION OF THE PREFERRED EMBODIMENTS

Dependent upon the particular type of piston ring, the marking may be applied either over one part or over the entire axial height of the running face of the ring. Preferably, the marking extends from that annular face of the piston ring which is to be oriented towards the combustion chamber in the internal combustion engine.

According to a preferred embodiment of the invention, the identification of the piston ring comprises the application of a relatively thin foil which is made of a synthetic material (for example PVC) and which, because of the earlier-described reasons regarding the stringent requirements concerning the running face of the piston ring, is less than $2\mu$ thick. It is a significant advantage of this embodiment that such a marking which extends from one of the annular faces onto the running face, does not adversely affect the sealing properties of the ring during its service since the marking is worn off immediately as the piston starts its operation. Further, the piston rings may be marked at the annular face and the running face by means of a colored layer which may be stamped or sprayed onto the piston ring.

Turning now to the FIGURE, there is shown a cast iron piston ring 1 which has a slightly conical running face 2. When installed, the circular edge 3 of greater diameter is oriented towards the oil sump of the internal combustion engine. In the vicinity of the piston ring gap 4, there is provided a marking 5 which, in the illustrated embodiment, is formed of a foil having a thickness of $1\mu$ and which has a color that differs from that of the piston ring. The marking extends from an annular surface 6 over only one portion of the conical running face 2.

In accordance with another preferred embodiment of the invention, the marking is provided by etching. In such a case the metal is treated with an etching agent only on the locations to be marked, that is, in the vicinity of the piston ring gap. The etching agent dissolves the metal at these locations up to an adjustable depth of less than $2\mu$ and thus the marking does not adversely affect the sealing function of the piston ring. A similarly small-quantity material removal from an annular ring face and the running face may be effected by an electrolytic or a thermal treatment.

According to another preferred embodiment of the invention, the marking is applied galvanically, that is, in appropriate baths a metallic deposit is provided by electrolysis at the locations to be marked. The thickness of the deposited layer depends from the intensity and duration of the current. Similarly, the marking may be applied by plating, that is, by the application of a thin metal layer which in color differs from the ring body; such a metal layer is rolled under pressure onto the ring body in a hot condition. During such an operation, the metal layer becomes welded to the base body. Copper, nickel and aluminum may be used as the metal layer. It is to be understood, however, that this particular method is not limited to these three metals.

In accordance with still another embodiment of the invention, the marking may be applied by sandblasting.

It will be understood that the above description of the present invention is susceptible to various modifications, changes and adaptations, and the same are intended to be comprehended within the meaning and range of equivalents of the appended claims.

What is claimed is:

1. A method of identifying the orientation of a piston ring having opposite annular flank faces, an inner circumferential face and an outer circumferential running face; comprising the step of applying, in a single operational step, a visual, thin synthetic foil marking of less than $2\mu$ thick exclusively to one of said flank faces and at least one part of said running face, whereby subsequent to said step the visual marking extends on said one flank face and continues on said running face.

2. A method as defined in claim 1, wherein the marking is applied simultaneously to the surface of one of said flank faces and over the entire axial height of said running face.

3. A method as defined in claim 1, wherein the marking is applied to that flank face of the piston ring which, when installed in an internal combustion engine, is oriented towards the combustion chamber thereof.

* * * * *